United States Patent
De Blois et al.

(10) Patent No.: US 12,123,360 B2
(45) Date of Patent: Oct. 22, 2024

(54) POOLED ARCHITECTURE FOR CONTROLLING ELECTROMECHANICAL ACTUATORS

(71) Applicant: SAFRAN AIRCRAFT ENGINES, Paris (FR)

(72) Inventors: Nicolas Bertrand Georges De Blois, Moissy-Cramayel (FR); Clément Dupays, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 228 days.

(21) Appl. No.: 17/756,970

(22) PCT Filed: Dec. 1, 2020

(86) PCT No.: PCT/FR2020/052233
§ 371 (c)(1),
(2) Date: Jun. 7, 2022

(87) PCT Pub. No.: WO2021/116558
PCT Pub. Date: Jun. 17, 2021

(65) Prior Publication Data
US 2023/0014208 A1    Jan. 19, 2023

(30) Foreign Application Priority Data

Dec. 9, 2019   (FR) ...................................... 1913944

(51) Int. Cl.
*G05B 19/29*      (2006.01)
*B60R 16/03*      (2006.01)
*F02C 9/18*       (2006.01)
*H02P 5/49*       (2016.01)

(52) U.S. Cl.
CPC ................ *F02C 9/18* (2013.01); *B60R 16/03* (2013.01); *H02P 5/49* (2016.02); *F05D 2220/323* (2013.01); *F05D 2260/606* (2013.01); *F05D 2270/62* (2013.01)

(58) Field of Classification Search
CPC ..................................... H02P 5/49; H02P 6/04
See application file for complete search history.

(56) References Cited

FOREIGN PATENT DOCUMENTS

| | | | | |
|---|---|---|---|---|
| CN | 102845045 A | * | 12/2012 | ......... B64D 11/0015 |
| CN | 210422780 U | * | 4/2020 | ................ F02C 9/00 |
| DE | 102011082965 A1 | | 1/2013 | |
| EP | 2942679 A2 | | 11/2015 | |
| WO | WO-2021228696 A1 | * | 11/2021 | ............ B60T 13/741 |

OTHER PUBLICATIONS

French Search Report issued in French Application No. 1913944 on Jun. 26, 2020 (2 pages).
International Search Report and Written Opinion issued in International Application PCT/FR2020/052233 with English Translation on Feb. 26, 2021 (11 pages).

* cited by examiner

*Primary Examiner* — Karen Masih
(74) *Attorney, Agent, or Firm* — Bookoff McAndrews, PLLC

(57) ABSTRACT

In an electromechanical actuation chain for controlling the movement of mobile loads of an aircraft turbine engine, from a control unit, one or more of these mobile loads being actuated by an electromechanical actuator, there is provided for control of this movement a single Ethernet controller having deterministic control that uses an Ethernet bus to control a set of converters acting selectively on the electromechanical actuators.

10 Claims, 1 Drawing Sheet

[Fig. 1]
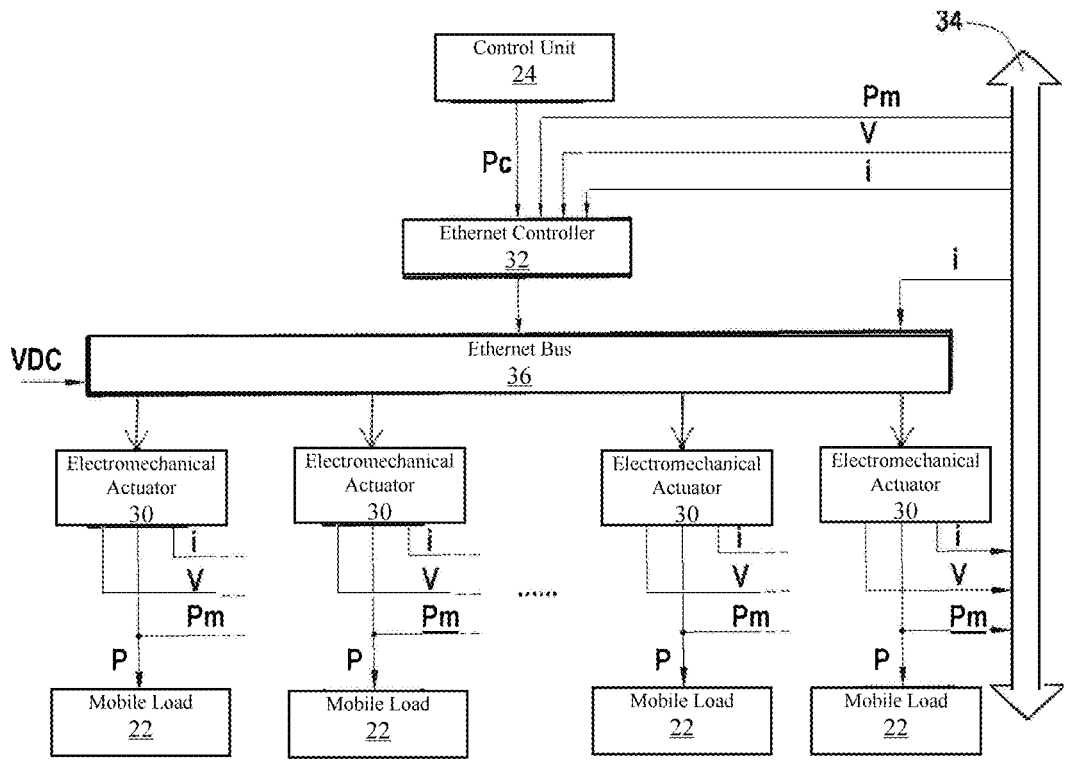
[Fig. 2]
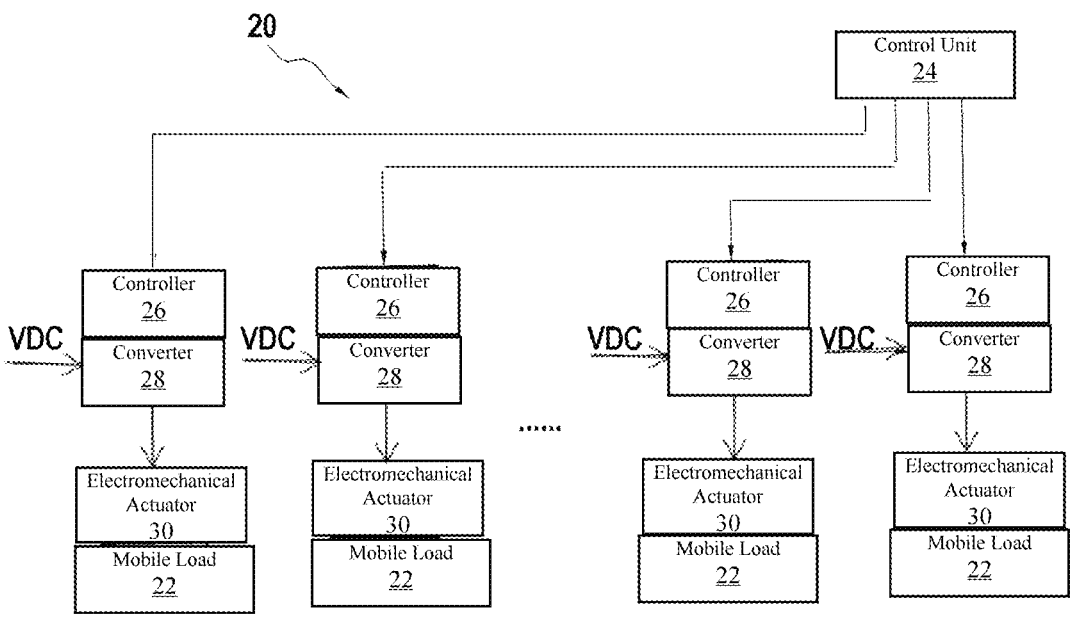
--PRIOR ART--

POOLED ARCHITECTURE FOR CONTROLLING ELECTROMECHANICAL ACTUATORS

CROSS-REFERENCE TO RELATED APPLICATIONS

This patent application is the U.S. National Stage entry under 35 U.S.C. § 371 of International Patent Application No. PCT/FR2020/052233, filed on Dec. 1, 2020, which claims the benefit of priority to French Patent Application No. 1913944, filed on Dec. 9, 2019.

TECHNICAL FIELD

The present invention relates to the general field of electrification of aircraft turbine engines.

PRIOR ART

In this field, mobile members or loads such as variable geometries of the turbine engine, which particularly comprise doors of variable bleed valves (VBVs) or pumps, can be controlled via an actuation chain of electromechanical type replacing the current system of hydraulic control having mechanical synchronisation composed, as is known, of a ring and set of cranks and levers (also called bell cranks). The principle of this actuation chain is to use an electromechanical actuator for each mobile load or for a reduced number of mobile loads. This type of architecture is said to be of distributed type.

This distributed architecture, illustrated in FIG. 2, is composed of an electromechanical actuation chain 20 ensuring control over the position of mobile loads 22, in open or closed loop depending on the type of desired control, via the electromechanical actuators 30 from a control unit 24 of the turbine engine e.g. an Electronic Engine Controller (EEC). This architecture is made possible through the use of power electronics (controller 26 and converter 28). However, this electromechanical actuation chain requires the providing of a converter 26 and controller 28 for each actuator 30.

The driving of mobile loads such as VBV doors assumes multiplication of the number of actuators involved, insofar as an actuator is allocated to each VBV door or to a reduced number of VBV doors, for example two to four doors. This therefore leads to multiplication of power electronics which, having regard to the criticality of the actuated systems, results in lack of reliability or robustness against their environment requiring systematic redundancy of the controllers within this distributed architecture.

Yet in the field of aeronautics, this systematic redundancy of controllers makes integration of power electronics impossible due to the considerable increase in mass/volume balance.

DESCRIPTION OF THE INVENTION

It is therefore a main object of the present invention to overcome said shortcoming by proposing a novel architecture for controlling mobile loads allowing optimisation of the overall mass/volume balance of the electromechanical actuation chain, whilst guaranteeing acceptable availability of the aircraft turbine engine.

This object is achieved with an electromechanical actuation chain for controlling the movement of mobile loads of an aircraft turbine engine, from a control unit, one or more of said mobile loads being actuated by an electromechanical actuator, characterized in that, to control said movement, it also comprises a single Ethernet controller having deterministic control that uses an Ethernet bus to control a set of converters acting selectively on said electromechanical actuators, Therefore, by significantly reducing the number of controllers in the electromechanical actuation chain, and by introducing a superfast communication protocol, the redundancy of prior art controllers is avoided.

Preferably, said electromechanical actuator is a permanent magnet synchronous motor, an asynchronous motor, a stepped motor or a variable reluctance motor whether or not coupled to linear or rotary mechanical transmission.

Advantageously, said converter is a chopper or inverter.

Preferably, said Ethernet controller is configured to manage as many current, speed and position loops as there are electromechanical actuators.

Advantageously the speed of transfer of information at the current and speed loops, current and position loops respectively, is at least one hundred times faster than that of the position loop, speed loop respectively, driving movement of the mobile load.

Preferably, the speed of transfer of information at the current loops corresponds to a transfer time of less than 15 microseconds, typically 10 microseconds.

Advantageously, the speed of transfer of information at the position or speed loop driving movement of the mobile load corresponds to a transfer time in the region of 15 milliseconds.

In one envisaged embodiment, said mobile loads can be variable bleed valves the movement of which is driven by a position loop, or pumps the movement of which is driven by a speed loop, or any other similar member the movement of which is driven by a position or speed loop.

The present invention also concerns an aircraft turbine engine comprising an electromechanical actuation chain to control the movement of mobile loads such as aforementioned.

BRIEF DESCRIPTION OF THE DRAWINGS

Other characteristics and advantages of the present invention will become apparent from the description given below with reference to the appended drawings illustrating an example of embodiment that is in no way limiting, and in which:

FIG. 1 is a flow diagram of a novel architecture of power electronics in an electromechanical mobile load actuation chain according to the invention, and FIG. 2 is a flow diagram of a conventional architecture of power electronics in an electromechanical mobile load actuation chain.

DESCRIPTION OF EMBODIMENTS

The invention proposes a pooled control architecture for controlling the electromechanical actuators of an aircraft turbine engine. For this purpose, the electromechanical actuation chain 10 for controlling movement of aircraft mobile loads 22, from a control unit 24, one or more of these mobile loads 22 (e.g. doors of variable bleed valves (VBVs) or other variable geometries such as pumps) being actuated by an electromechanical actuator 30, comprises a single Ethernet controller 32 which in the invention uses an Ethernet bus 34 to control a set of converters 36 (the number thereof being no more than the number of actuators) acting selectively on the electromechanical actuators 30. To allow controlling of the mobile load 22, the controller 30 delivers feedback (typically a position, here Pm, or a speed) to the control unit 24 which returns a position (Pc) or speed instruction. This instruction uses a rapid communication protocol of deterministic type to allow the management in parallel of the control loops of each electromechanical actuator 30. By deterministic it is meant that, for each item of information, provision is made for the exact time needed for transmission thereof by the Ethernet controller.

The control loops are typically current i, speed V and position P loops. When movement of the mobile load is position-controlled (the case for VBV doors illustrated), the main loop is the position loop, the speed and current loops then being considered as secondary loops. On the other hand, when movement of the mobile load is speed-controlled (the case for pumps for example), the main loop is the speed loop, the position and current loops then being considered as secondary loops.

The deterministic Ethernet controller can be a dedicated component (e.g. integrating speed and current loops for control of vector modulation type) or a microprocessor provided with an Ethernet communication protocol.

The speed of information transfer at these two current and speed loops (in the event of a position instruction) or current and position loops (in the event of a speed instruction) allowed by the Ethernet protocol is sufficiently fast (transfer time <15 µs and typically <10 µs) to be considered instantaneous at the (position or speed) control loop which has a transfer speed that is at least one hundred times faster and advantageously about one thousand times faster (i.e. a transfer time in the region of 15 ms).

The converters 36 are for example single-phase choppers or three-phase inverters (even six-phase for redundancies at the actuators) delivering an alternating current from a direct current (typically derived from a DC 270 V Bus) and which, when being the same in number as the actuators, are advantageously mechanically integrated in these actuators. When the mobile load is a VBV door, the actuator is integrated in each VBV door (in the so-called «Booster» zone) and there are therefore as many actuators as there are VBV doors. This actuator is preferably a permanent magnet synchronous motor (however a variable reluctance motor, stepped motor or asynchronous motor can also be envisaged) which can be coupled to mechanical transmission that is either linear (of ball or roller screw type for example) or rotary operating directly with the load to be driven.

The invention claimed is:

1. An electromechanical actuation chain for controlling the movement of mobile loads of an aircraft turbine engine, from a control unit, one or more of said mobile loads being actuated by an electromechanical actuator, wherein, to control said movement, the electromechanical actuation chain further comprises a single Ethernet controller having deterministic control that uses an Ethernet bus to send instructions to control a set of converters acting selectively on said electromechanical actuators, said deterministic control includes, for each instruction, a provision of an exact time needed for transmission thereof by the Ethernet controller.

2. The electromechanical actuation chain according to claim 1, wherein said electromechanical actuator is a permanent magnet synchronous motor, an asynchronous motor, a variable reluctance motor or a stepped motor, whether or not coupled to linear or rotary mechanical transmission.

3. The electromechanical actuation chain according to claim 1, wherein said converter is a chopper or inverter.

4. The electromechanical actuation chain according to claim 1, wherein said deterministic Ethernet controller is configured to manage as many current, speed and position loops as there are electromechanical actuators.

5. The electromechanical actuation chain according to claim 4, wherein the speed of transfer of information at the current and speed loops, current and position loops respectively, is at least one hundred times faster than that of the position loop, speed loop respectively, driving movement of the mobile load.

6. The electromechanical actuation chain according to claim 5, wherein the speed of transfer of information at the current loops corresponds to a transfer time of less than 15 microseconds, typically 10 microseconds.

7. The electromechanical actuation chain according to claim 5, wherein the speed of transfer of information at the position or speed loop driving movement of the load corresponds to a transfer time in the region of 15 milliseconds.

8. The electromechanical actuation chain according to claim 1, wherein said mobile loads are variable bleed valves the movement of which is driven by a position loop.

9. The electromechanical actuation chain according to claim 1, wherein said mobile loads are pumps the movement of which is driven by a speed loop.

10. An aircraft turbine engine comprising an electromechanical actuation chain according to claim 1.

* * * * *